United States Patent
Aburada et al.

(10) Patent No.: US 10,570,047 B2
(45) Date of Patent: Feb. 25, 2020

(54) CONTINUOUS PROCESSING OF FLEXIBLE GLASS RIBBON

(71) Applicant: CORNING INCORPORATED, Corning, NY (US)

(72) Inventors: Tomohiro Aburada, Painted Post, NY (US); Jeffrey Robert Amadon, Lexington, KY (US); Douglas Edward Brackley, Horseheads, NY (US); Gautam Narendra Kudva, Horseheads, NY (US); Gary Edward Merz, Rochester, NY (US); Eric Lee Miller, Corning, NY (US); Michael Yoshiya Nishimoto, Horseheads, NY (US); Ian David Tracy, San Jose, CA (US); Matthew Daniel Trosa, Horseheads, NY (US); Rui Zhang, Elmira, NY (US)

(73) Assignee: Corning Incorporated, Corning, NY (US)

( * ) Notice: Subject to any disclaimer, the term of this patent is extended or adjusted under 35 U.S.C. 154(b) by 355 days.

(21) Appl. No.: 15/324,518

(22) PCT Filed: Jul. 7, 2015

(86) PCT No.: PCT/US2015/039280
§ 371 (c)(1),
(2) Date: Jan. 6, 2017

(87) PCT Pub. No.: WO2016/007448
PCT Pub. Date: Jan. 14, 2016

(65) Prior Publication Data
US 2017/0197864 A1    Jul. 13, 2017

Related U.S. Application Data

(60) Provisional application No. 62/021,924, filed on Jul. 8, 2014.

(51) Int. Cl.
*C08B 17/06* (2006.01)
*C03B 33/00* (2006.01)
(Continued)

(52) U.S. Cl.
CPC .......... *C03B 17/068* (2013.01); *B65H 20/32* (2013.01); *B65H 23/1888* (2013.01);
(Continued)

(58) Field of Classification Search
CPC ... C03B 17/068; C03B 17/064; C03B 17/067; C03B 17/06
See application file for complete search history.

(56) References Cited

U.S. PATENT DOCUMENTS 2,259,162 A * 10/1941 Hirsch ................. B29D 30/248
156/400
6,502,423 B1 * 1/2003 Ostendarp ............... C03B 17/06
65/100
(Continued)

FOREIGN PATENT DOCUMENTS

| JP | 2012096989 A | * | 5/2012 | ......... B65H 23/0322 |
| JP | 2012136413 A |   | 7/2012 | |

(Continued)

OTHER PUBLICATIONS

Burkle WO-0041978-A1 machine translation as provided by https://patentscope.wipo.int/search/en/detail.jsf?docId=WO2000041978&tab=PCTDOCUMENTS&maxRec=1000 on Dec. 10, 2018 (Year: 2000).*

(Continued)

*Primary Examiner* — Jodi C Franklin
(74) *Attorney, Agent, or Firm* — Jeffrey A. Schmidt; Ryan T. Hardee

(57) ABSTRACT

A method of continuously processing glass ribbon having a thickness ≤0.3 mm. The method includes providing a glass
(Continued)

processing apparatus having a first processing zone, a second processing zone and a third processing zone. The glass ribbon is continuously fed from the first processing zone, through the second processing zone to the third processing zone. The feed rate of the glass ribbon is controlled through each processing zone using a global control device. A first buffer zone is provided between the first processing zone and the second processing zone in which the glass substrate is supported in a first catenary between two, spaced-apart, payoff positions. A second buffer zone is provided between the second processing zone and the third processing zone in which the glass substrate is supported in a second catenary between two, spaced-apart, payoff positions.

32 Claims, 6 Drawing Sheets

(51) Int. Cl.
| | | |
|---|---|---|
| *B65H 20/32* | (2006.01) | |
| *C03B 17/06* | (2006.01) | |
| *C03B 33/023* | (2006.01) | |
| *C03B 33/09* | (2006.01) | |
| *B65H 23/188* | (2006.01) | |

(52) U.S. Cl.
CPC ........ *C03B 17/064* (2013.01); *C03B 33/0235* (2013.01); *C03B 33/091* (2013.01); *B65H 2301/4148* (2013.01); *B65H 2801/61* (2013.01)

(56) References Cited

U.S. PATENT DOCUMENTS

| | | | | |
|---|---|---|---|---|
| 6,853,123 | B1 | 2/2005 | Nattermann et al. | |
| 9,790,121 | B2 | 10/2017 | Abramov et al. | |
| 2005/0016214 | A1* | 1/2005 | Hsu | C03B 13/04 |
| | | | | 65/33.9 |
| 2009/0107182 | A1* | 4/2009 | Anderson | C03B 17/068 |
| | | | | 65/90 |
| 2011/0314870 | A1* | 12/2011 | Fredholm | C03B 17/062 |
| | | | | 65/94 |
| 2012/0125967 | A1* | 5/2012 | Furuta | C03B 33/0235 |
| | | | | 225/3 |
| 2012/0247154 | A1* | 10/2012 | Abramov | C03B 33/0235 |
| | | | | 65/54 |
| 2012/0304695 | A1* | 12/2012 | Lakota | C03B 13/04 |
| | | | | 65/29.19 |
| 2013/0133369 | A1* | 5/2013 | Lock | C03B 13/08 |
| | | | | 65/60.1 |
| 2013/0133371 | A1* | 5/2013 | Burdette | C03B 17/068 |
| | | | | 65/91 |
| 2014/0017475 | A1* | 1/2014 | Teranishi | C03B 33/0235 |
| | | | | 428/220 |
| 2014/0130649 | A1* | 5/2014 | Chang | C03B 33/033 |
| | | | | 83/26 |
| 2015/0218034 | A1* | 8/2015 | Bigelow | B26D 7/18 |
| | | | | 156/271 |
| 2015/0251944 | A1* | 9/2015 | Brackley | C03B 33/033 |
| | | | | 83/23 |
| 2015/0259236 | A1* | 9/2015 | Marshall | C03B 33/033 |
| | | | | 225/2 |
| 2015/0367444 | A1* | 12/2015 | Abramov | B23K 37/0235 |
| | | | | 65/112 |
| 2016/0075589 | A1* | 3/2016 | Shi | B65H 23/24 |
| | | | | 65/25.2 |
| 2018/0134605 | A1* | 5/2018 | Aburada | C03B 33/0235 |
| 2018/0141847 | A1* | 5/2018 | Booth | B65H 20/32 |
| 2018/0141848 | A1* | 5/2018 | Aburada | C03B 33/0235 |

FOREIGN PATENT DOCUMENTS

| | | | | |
|---|---|---|---|---|
| WO | WO-0041978 A1 * | 7/2000 | ............... | B32B 3/04 |
| WO | WO-2012176594 A1 * | 12/2012 | ........... | B65H 18/103 |
| WO | WO-2014074400 A2 * | 5/2014 | ........... | C03B 33/033 |
| WO | WO-2015029669 A1 * | 3/2015 | ......... | C03B 33/0215 |

OTHER PUBLICATIONS

JP-2012096989-A machine translation as provided by https://www4.j-platpat.inpit.go.jp/cgi-bin/tran_web_cgi_ejje?u=http://www4.j-platpat.inpit.go.jp/eng/translation/20181210203308891522558494 83055026BB67EEC69B9E0AFCA6D4OAD473D5FD3 (Year: 2012).*

WO-2015029669-A1 machine translation as provided https://patentscope.wipo.int/search/en/detail.jsf?docId=WO2015029669&tab=FULLTEXT&office=&prevFilter=&sortOption=Pub+Date+Desc&queryString=FP%3A%282015029669%29&recNum=2&maxRec=3 (Year: 2015).*

English Translation of CN201580037182.2 Office Action dated Nov. 14, 2018; 13 pages; Chinese Patent Office.

Machine Translation of JP2017501020 Office Action dated Jun. 5, 2019, Japan Patent Office, 4 PGS.

* cited by examiner

CONTINUOUS PROCESSING OF FLEXIBLE GLASS RIBBON

CROSS-REFERENCE TO RELATED APPLICATIONS

This application claims the benefit of priority under 35 U.S.C. § 371 of International Patent Application Serial No. PCT/US15/39280, filed on Jul. 7, 2015, which in turn, claims the benefit of priority of U.S. Provisional Patent Application Ser. No. 62/021,924 filed on Jul. 8, 2014, the contents of each of which are relied upon and incorporated herein by reference in their entireties.

TECHNICAL FIELD

The present invention relates to apparatus and methods for continuous processing of flexible glass ribbon.

BACKGROUND

Glass processing apparatus are commonly used to form various glass products for example LCD sheet glass. Glass substrates in flexible electronic applications are becoming thinner and lighter. Glass substrates having thicknesses lower than 0.5 mm, for example less than 0.3 mm, for example 0.1 mm or even thinner can be desirable for certain display applications, especially portable electronic devices for example laptop computers, handheld devices and the like.

Flexible glass substrates, for example glass substrates used in the manufacture of display devices, are often processed in sheet form. Such processing can include, for example, the deposition of thin film electronics onto the substrate. Sheet form handling has relatively slow processing speeds compared to continuous processes, since sheets must be individually transported, fixtured, processed and removed. Continuous processing of flexible glass substrates in ribbon form can provide relatively faster manufacturing rates. One benefit for a thin glass substrate is that the flexibility afforded by the thin ribbon allows it to be used in processes utilizing rolls of the material.

SUMMARY

The present concept involves continuous processing of flexible glass ribbon. Continuous processing of flexible glass ribbon can include connections among a number of process steps, for example forming, cutting, spooling, etc. Presented herein is a process to actively drive the flexible glass ribbon at desired locations to maintain tension and shape, control steering, minimize motion and isolate disturbances during processing of the flexible glass ribbon.

One commercial advantage to the present approach is that disturbances within the flexible glass ribbon can be isolated to inhibit the disturbances from travelling upstream and downstream, possibly affecting other regions where processing is taking place. Motion of the flexible glass ribbon can be controlled in various processing areas, for example, laser separation.

According to a first aspect, a method of continuous processing of flexible glass ribbon having a thickness of no more than 0.3 mm using a glass processing apparatus, the method comprising:

providing the glass processing apparatus having at least three processing zones including a first processing zone, a second processing zone and a third processing zone;

continuously feeding the flexible glass ribbon from the first processing zone, through the second processing zone to the third processing zone;

controlling feed rate of the flexible glass ribbon through each of the first processing zone, second processing zone and third processing zone using a global control device;

providing a first buffer zone between the first processing zone and the second processing zone in which the flexible glass substrate is supported in a first catenary between two, spaced-apart payoff positions; and providing a second buffer zone between the second processing zone and the third processing zone in which the flexible glass substrate is supported in a second catenary between two, spaced-apart payoff positions.

According to a second aspect, there is provided the method of aspect 1, further comprising wherein tension within the flexible glass ribbon in the travel direction is no more than about 1.8 kilograms per meter (kg/m) (about 0.1 pounds per linear inch (pli)) in at least one of the first buffer zone and the second buffer zone.

According to a third aspect, there is provided the method of aspect 1 or aspect 2, comprising producing the flexible glass ribbon in the first processing zone using a forming apparatus.

According to a fourth aspect, there is provided the method of aspect 3, wherein the step of producing the flexible glass ribbon includes using a fusion draw process.

According to a fifth aspect, there is provided the method of any one of aspects 1-4, comprising separating an edge of the flexible glass ribbon as the flexible glass ribbon moves by a cutting device within the second processing zone forming a continuous strip of edge trim connected to a central portion of the flexible glass ribbon.

According to a sixth aspect, there is provided the method of any one of aspects 1-5, comprising winding the flexible glass ribbon into a roll at the third processing zone using a winding apparatus.

According to a seventh aspect, there is provided the method of any one of aspects 1-6, wherein the two, spaced-apart payoff positions of at least one of the first and second buffer zones are formed using rollers.

According to an eighth aspect, there is provided the method of aspect 7, wherein rotation of at least one of the rollers is controlled by the global control device.

According to a ninth aspect, a method of continuous processing of flexible glass ribbon having a thickness of no more than 0.3 mm using a glass processing apparatus including a forming apparatus in a first processing zone, an edge trimming apparatus in a second processing zone and a winding apparatus in a third processing zone, the method comprising:

forming the flexible glass ribbon in the first processing zone and feeding the flexible glass ribbon though the first processing zone at a first feed rate;

feeding the flexible glass ribbon through the second processing zone while separating an edge of the flexible glass ribbon as the flexible glass ribbon moves by a cutting device within the second processing zone forming a continuous strip of edge trim connected to a central portion of the flexible glass ribbon;

feeding the flexible glass ribbon through the third processing zone while winding the flexible glass ribbon into a roll;

wherein the first, second and third feed rates are controlled by a global control device.

According to a tenth aspect, there is provided the method of aspect 9, further comprising providing a first buffer zone between the first processing zone and the second processing zone in which the flexible glass substrate is supported in a first catenary between two, spaced-apart payoff positions.

According to an eleventh aspect, there is provided the method of aspect 10, further comprising providing a second buffer zone between the second processing zone and the third processing zone in which the flexible glass substrate is supported in a second catenary between two, spaced-apart payoff positions.

According to a twelfth aspect, there is provided the method of aspect 11, wherein tension within the flexible glass ribbon in the travel direction is no more than about 1.8 kg/m (about 0.1 pli) in at least one of the first buffer zone and the second buffer zone.

According to a thirteenth aspect, there is provided the method of aspect 11, wherein the two, spaced-apart payoff positions of at least one of the first and second buffer zones are formed using rollers.

According to a fourteenth aspect, there is provided the method of aspect 13, wherein rotation of at least one of the rollers is controlled by the global control device.

According to a fifteenth aspect, a glass processing apparatus that processes a flexible glass ribbon having a thickness of no more than 0.3 mm comprising:
a forming apparatus in a first processing zone, the forming apparatus configured to form the flexible glass ribbon in the first processing zone;
an edge trimming apparatus in a second processing zone, the edge trimming apparatus configured to separate an edge of the flexible glass ribbon as the flexible glass ribbon moves by a cutting device within the second processing zone forming a continuous strip of edge trim connected to a central portion of the flexible glass ribbon;
a winding apparatus in a third processing zone, the winding apparatus configured to wind the flexible glass ribbon into a roll;
a first buffer zone between the first processing zone and the second processing zone in which the flexible glass substrate is supported in a first catenary between two, spaced-apart payoff positions; and
a second buffer zone between the second processing zone and the third processing zone in which the flexible glass substrate is supported in a second catenary between two, spaced-apart payoff positions.

According to a sixteenth aspect, there is provided the method of aspect 15, further comprising a global control device that controls a feed rate of the flexible glass substrate within the first, second and third processing zones.

According to a seventeenth aspect, there is provided the method of aspect 15 or aspect 16, wherein the two, spaced-apart payoff positions of at least one of the first and second buffer zones are formed using rollers.

According to an eighteenth aspect, there is provided the method of any one of aspects 15-17, wherein rotation of at least one of the rollers is controlled by the global control device.

According to a nineteenth aspect, there is provided the apparatus of any one of aspects 15-19, wherein the forming apparatus forms the flexible glass ribbon using a fusion draw process.

According to a twentieth aspect, there is provided the method or apparatus of any one of aspects 1-20, wherein tension within the flexible glass ribbon in the travel direction is from about 0.9 kg/m to about 5.4 kg/m (from about 0.05 pli to about 0.3 pli) in at least one of the first, second and third processing zones.

According to a twenty-first aspect, there is provided the method or apparatus of any one of claims 1-21, wherein tension within the flexible glass ribbon in the travel direction is from about 1.4 kg/m to about 2.7 kg/m (from about 0.08 pli to about 0.15 pli) in at least one of the first, second and third processing zones.

Additional features and advantages will be set forth in the detailed description which follows, and in part will be readily apparent to those skilled in the art from the description or recognized by practicing the invention as exemplified in the written description and the appended drawings and as defined in the appended claims. It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features of the invention disclosed in this specification and in the drawings can be used in any and all combinations.

DETAILED DESCRIPTION

Figure 1:
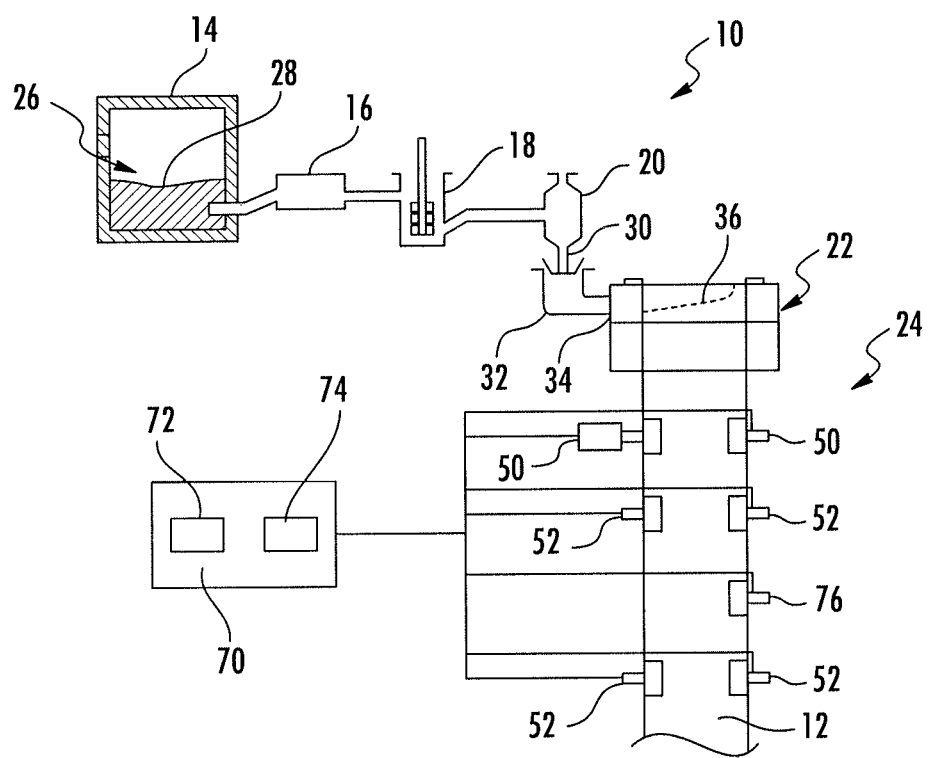
FIG. 1 is a schematic view of an embodiment of a flexible glass forming method and apparatus.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Embodiments described herein generally relate to apparatus and methods for continuous manufacturing of flexible glass ribbon by actively controlling tension and steering of the continuous flexible glass ribbon at locations throughout the process from root to spooler or winder. A number of processing zones may be provided within the process where tension and shape of the continuous flexible glass ribbon can be controlled independently by isolating the processing zones from one another using buffer zones where the flexible glass ribbon hangs in free loops. Driven mechanisms for example rollers, belts, etc. can be used to deliver tension parallel to the glass travel direction as well as transverse to the glass travel direction.

While glass is generally known as a brittle material, inflexible and prone to scratching, chipping and fracture, glass having a thin cross section can in fact be quite flexible. Glass in long thin sheets or ribbons can be wound and un-wound from rolls, much like paper or plastic film.

Maintaining lateral alignment of the glass ribbon as the glass ribbon travels through glass manufacturing equipment may be complicated by misalignment of components of the glass manufacturing equipment. Further, instabilities, perturbations, vibrations, and transient effects that may exist in manufacturing environments or in processing and handling equipment may cause intermittent or extended misalignment of the glass ribbon to occur. In extreme cases, the instabilities, perturbations, vibrations, and transient effects of the glass ribbon may lead to fracture.

Some glass ribbons are processed by continuously separating thickened edge beads from the glass ribbon. During the bead removal process, the thickened edge beads are separated from the glass ribbon and are conveyed down a path different than that of a quality portion of the glass ribbon. The thickened beads impart stress on the glass ribbon at the point where the glass ribbon is separated from the thickened edge beads. The relative angle between the glass ribbon and the separated thickened edge beads affects the stress at the separation point, and misalignment of the glass ribbon entering the bead separation process can increase the stress at the separation point, potentially causing ribbon breakage or poor edge separation attributes, for example inferior edge strength and edge damage. By using the techniques described herein, some embodiments of glass ribbon achieve an edge strength of at least about 100 MPA, for example at least about 200 MPa, at the cut edge after separation of the bead.

The apparatus and methods described facilitate continuous processing of flexible glass ribbon by isolating various processing zones from one another using free loops (which may also be called buffer zones or catenaries) in the flexible glass ribbon between processing zones. The processing zones may include forming, edge separation and winding; however, other types of processing zones may be utilized. Further, speed and tension of the flexible glass ribbon may be controlled locally within the processing zones using a global control device, for example a computer that monitors conditions within each of the zones. Such apparatus and methods can be used to drive the flexible glass ribbon at desired locations while maintaining tension and shape, controlling steering, reducing motion and isolating disturbance.

Referring to FIG. 1, an exemplary glass manufacturing apparatus 10 that incorporates a fusion process to produce a glass ribbon 12 is depicted. The glass manufacturing apparatus 10 may be part of a glass processing apparatus 100 (FIG. 5), as will be described in greater detail below, where a glass ribbon is formed, separated along edges and then rolled in a continuous process. The glass manufacturing apparatus 10 includes a melting vessel 14, a fining vessel 16, a mixing vessel 18 (e.g., a stir chamber), a delivery vessel 20 (e.g., a bowl), a forming apparatus 22 and a draw apparatus 24. The glass manufacturing apparatus 10 produces a continuous glass ribbon 12 from batch materials, first by melting and combining the batch materials into molten glass, distributing the molten glass into a preliminary shape, applying tension to the glass ribbon 12 to control the dimensions of the glass ribbon 12 as the glass cools and viscosity increases such that the glass ribbon 12 goes through a visco-elastic transition and has mechanical properties that that give the glass ribbon 12 stable dimensional characteristics.

In operation, batch materials for forming glass are introduced into the melting vessel 14 as indicated by arrow 26 and are melted to form molten glass 28. The molten glass 28 flows into the fining vessel 16, wherein gas bubbles are removed from the molten glass. From the fining vessel 16, the molten glass 28 flows into the mixing vessel 18, where the molten glass 28 undergoes a mixing process to homogenize the molten glass 28. The molten glass 28 flows from the mixing vessel 18 to the delivery vessel 20, which delivers the molten glass 28 through a downcomer 30 to an inlet 32 and into the forming apparatus 22.

Figure 2:
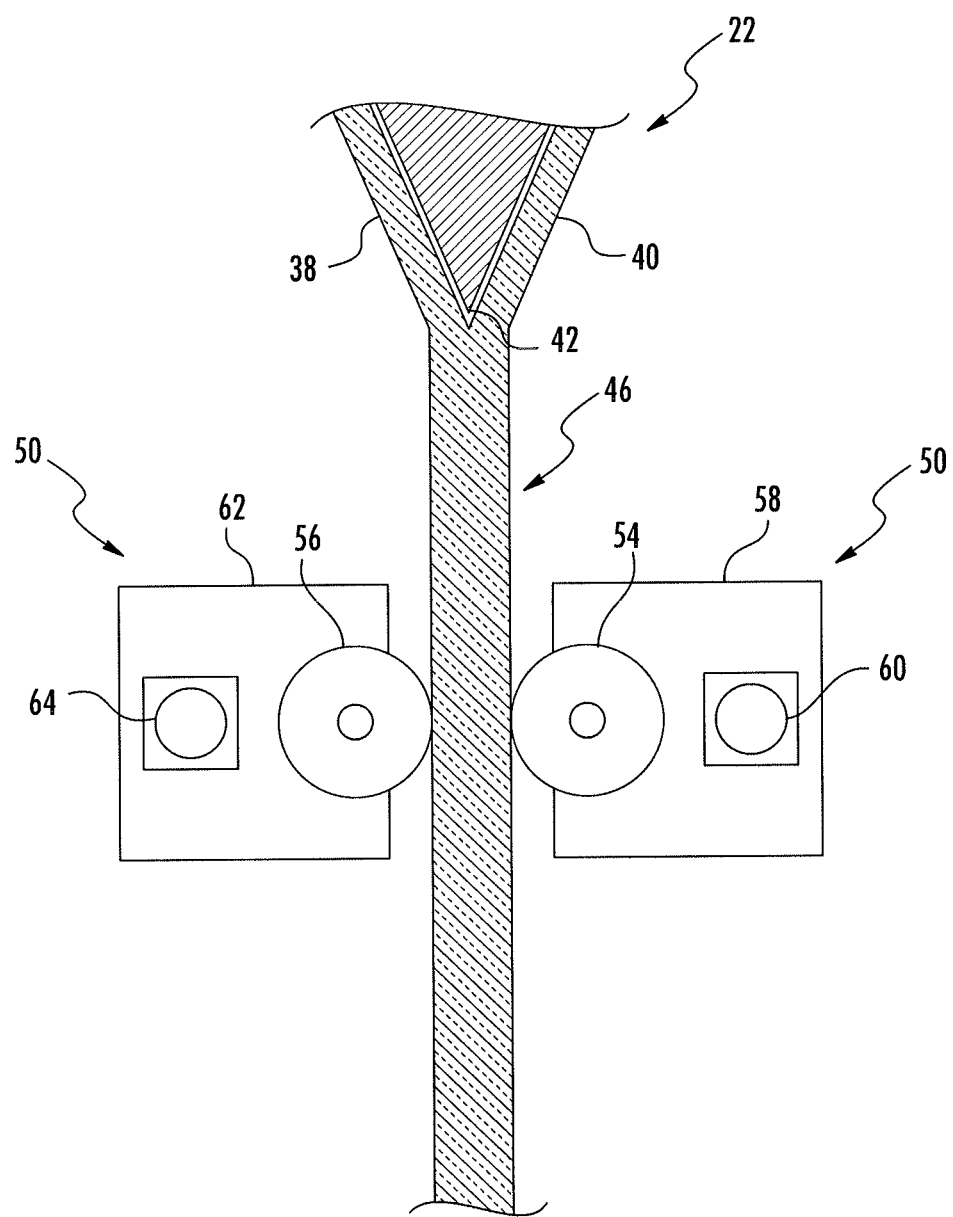
FIG. 2 is a schematic, detail view of the flexible glass forming process and apparatus of FIG. 1.

The forming apparatus 22 depicted in FIG. 1 is used in a fusion draw process to produce a flexible glass ribbon 46 that has high surface quality and low variation in thickness. The forming apparatus 22 includes an opening 34 that receives the molten glass 28. The molten glass 28 flows into a trough 36 and then overflows and runs down the sides of the trough 36 in two partial ribbon portions 38, 40 (see FIG. 2) before fusing together below the root 42 of the forming apparatus 22. The two partial ribbon portions 38, 40 of the still-molten glass 28 rejoin with one another (e.g., fuse) at locations below the root 42 of the forming apparatus 22, thereby forming a flexible glass ribbon 46 (also referred to as a glass ribbon). The flexible glass ribbon 46 is drawn downward from the forming apparatus by the draw apparatus 24. While the forming apparatus 22 is shown and described herein implements a fusion draw process, it should be understood that other forming apparatuses may be used including, without limitation, slot draw apparatuses for example.

As shown in FIG. 1 and as will be described in greater detail below, the draw apparatus 24 may include a plurality of actively-driven stub roller pairs 50, 52, each of which include a front-side stub roller 54 and a rear-side stub roller 56. The front-side stub roller 54 is coupled to a front-side transmission 58, which is coupled to a front-side motor 60. The front-side transmission 58 modifies the output speed and torque of the front-side motor 60 that is delivered to the front-side stub roller 54. Similarly, the rear-side stub roller 56 is coupled to a rear-side transmission 62, which is coupled to a rear-side motor 64. The rear-side transmission 62 modifies the output speed and torque of the rear-side motor 64 that is delivered to the rear-side stub roller 56.

Operation of the plurality of stub roller pairs 50, 52 is controlled by a global control device 70 (e.g., a programmable logic controller—PLC) for a variety of conditions including, for example and without limitation, torque applied to the flexible glass ribbon 46 and rate of rotation of the stub rollers 54, 56. The draw forces applied to the flexible glass ribbon 46 by the plurality of stub roller pairs 50, 52 while the flexible glass ribbon 46 is still in a visco-elastic state cause the flexible glass ribbon 46 to pull or stretch, thereby controlling the dimensions of the flexible glass ribbon 46 by controlling the tension applied to the flexible glass ribbon 46 in one or both the draw and cross-draw directions as the flexible glass ribbon 46 translates along the draw apparatus 24, while also imparting motion to the flexible glass ribbon 46.

The global control device 70 may include computer readable instructions stored in memory 72 and executed by a processor 74 that can determine, among other things, draw tension and speed of the flexible glass ribbon 46 provided by the stub roller pairs 50 and 52, for example, using any suitable sensors that provide feedback to the global control device 70. Further, the computer readable instructions can allow modification of parameters, for example torque and velocity of the stub roller pairs 50, 52 in light of feedback from the sensors. As one example, a stub roller 76 may be provided that communicates with the global control device 70 to indicate rate of rotation. The rate of rotation of the stub roller 76 with the flexible glass ribbon 46 can be used by the global control device 70 to determine the extrinsic linear feed rate of the flexible glass ribbon 46 as the flexible glass ribbon 46 moves thereby. Although there is shown one pair of stub rollers 50 on each side of the ribbon, any suitable number of these type of stub roller pairs may be used, depending upon draw length and desired control. Similarly, although two of stub roller pairs 52 are shown on each side of the ribbon, any suitable number of these type of stub roller pairs 52 may be used.

As the flexible glass ribbon 46 is drawn through the draw apparatus 24, the glass has an opportunity to cool. The glass manufacturing apparatus 100 having the plurality of stub roller pairs 50, 52 may improve the control and consistency of the cross-draw tension and/or down-drawn tension in the area in which the glass ribbon 46 goes through a visco-elastic transformation. This area may be defined as the "setting zone" in which the stress and flatness are set into the glass ribbon 46. Glass manufacturing apparatus 100 that include the plurality of actively driven stub roller pairs 50, 52 may provide improvements in the manufacturing of flexible glass ribbon 46 as compared to conventionally designed manufacturing apparatus that incorporate rollers that extend along the entire width of the flexible glass ribbon 46. However, in certain situations, manufacturing apparatus that utilize rollers that extend along the entire width of the flexible glass ribbon 46 may be used.

Figure 3:
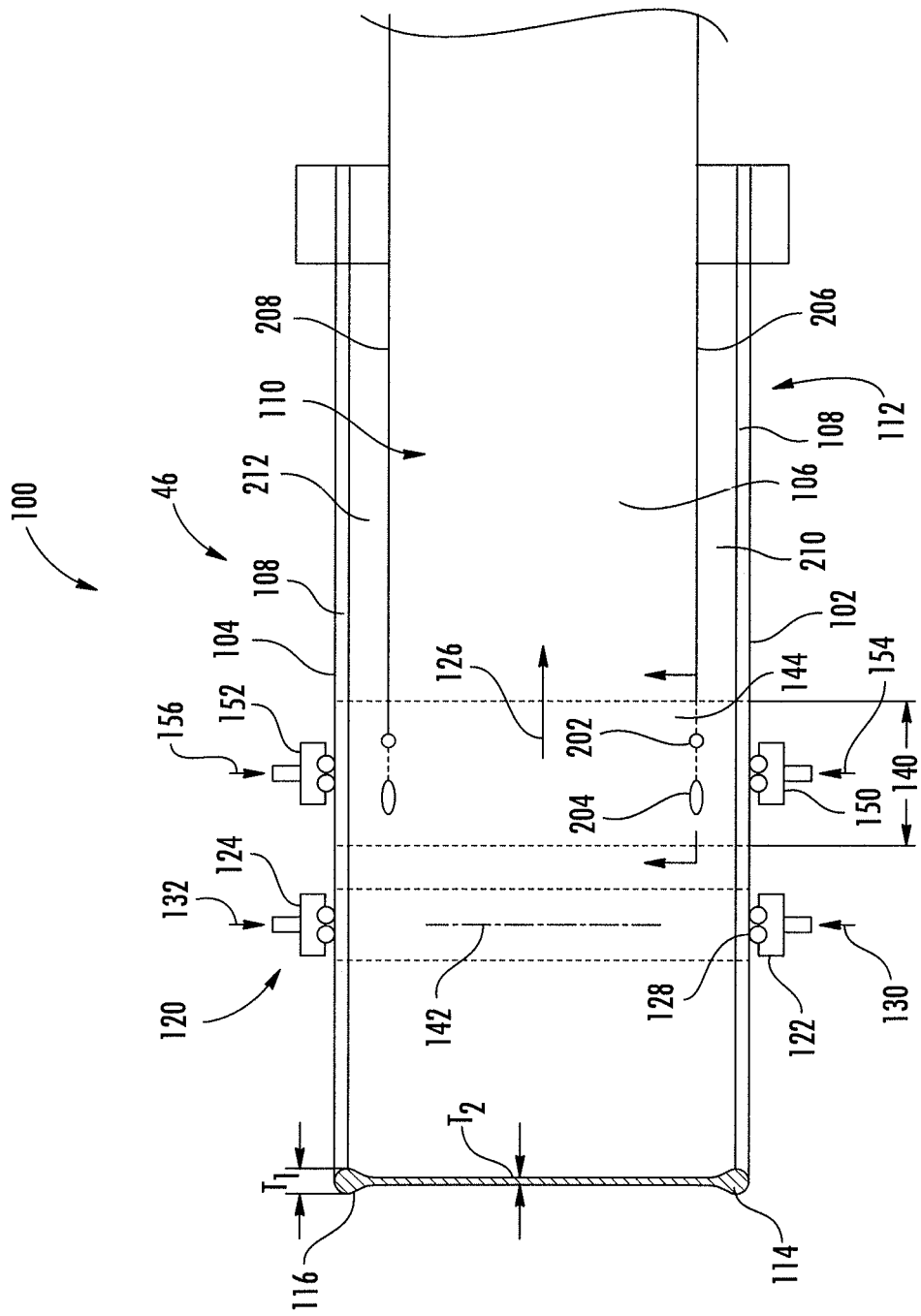
FIG. 3 is a schematic, plan view of an embodiment of an edge trimming method and apparatus.

The global control device 70 may use the draw apparatus 24 to set a global master speed for the glass processing apparatus 100 (FIG. 5), while also shaping the flexible glass ribbon 46. Referring to FIG. 3, as noted above, the glass manufacturing system 10 may be part of the glass processing apparatus 100. The flexible glass ribbon 46 is illustrated being conveyed through the glass processing apparatus 100, another portion of which is illustrated by FIG. 3. The flexible glass ribbon 46 may be conveyed in a continuous fashion from the glass manufacturing system 10 (FIG. 1) through the glass processing apparatus 100. The flexible glass ribbon 46 includes a pair of opposed first and second edges 102 and 104 that extend along a length of the flexible glass ribbon 46 and a central portion 106 that spans between the first and second edges 102 and 104. In some embodiments, the first and second edges 102 and 104 may be covered in a pressure sensitive adhesive tape 108 that is used to protect and shield the first and second edges 102 and 104 from contact. The tape 108 may be applied to one or both of the first and second edges 102 and 104 as the flexible glass ribbon 46 moves through the apparatus 100. In other embodiments, the adhesive tape 108 may not be used. A first broad surface 110 and an opposite, second broad surface 112 also spans between the first and second edges 102 and 104, forming part of the central portion 106.

In embodiments where the flexible glass ribbon 46 is formed using a down draw fusion process, the first and second edges 102 and 104 may include beads 114 and 116 with a thickness $T_1$ that is greater than a thickness $T_2$ within the central portion 106. The central portion 106 may be "ultra-thin" having a thickness $T_2$ of about 0.3 mm or less including but not limited to thicknesses of, for example, about 0.01-0.05 mm, about 0.05-0.1 mm, about 0.1-0.15 mm and about 0.15-0.3 mm, although flexible glass ribbons 46 with other thicknesses may be formed in other examples.

The flexible glass ribbon 46 is conveyed through the apparatus 100 using a conveyor system 120 that is controlled by the global control device 70. Lateral guides 122 and 124 may be provided to orient the flexible glass ribbon 46 in the correct lateral position relative to the machine or travel direction 126 of the flexible glass ribbon 46. For example, as schematically shown, the lateral guides 122 and 124 may include rollers 128 that engage the first and second edges 102 and 104. Opposed forces 130 and 132 may be applied to the first and second edges 102 and 104 using the lateral guides 122 and 124 that help to shift and align the flexible glass ribbon 46 in the desired lateral orientation in the travel direction 126.

The glass processing apparatus 100 can further include a cutting zone 140 downstream from a bend axis 142 about which the flexible glass ribbon 46 may be bent. In one example, the apparatus 100 may include a cutting support member configured to bend the flexible glass ribbon 46 in the cutting zone 140 to provide a bent target segment 144 with a bent orientation. Bending the target segment 144 within the cutting zone 140 can help stabilize the flexible glass ribbon 46 during the cutting procedure. Such stabilization can help prevent buckling or disturbing the flexible glass ribbon profile during the procedure of separating at least one of the first and second edges 102 and 104 from the central portion 106 of the flexible glass ribbon 46.

Providing the bent target segment 144 in the cutting zone 140 can increase the rigidity of the flexible glass ribbon 46 throughout the cutting zone 140. As such, as shown in FIG.

3, optional lateral guides 150, 152 can engage the flexible glass ribbon 46 in a bent condition within the cutting zone 140. Forces 154 and 156 applied by the lateral guides 150 and 152 are therefore less likely to buckle or otherwise disturb the stability of the glass ribbon profile when laterally aligning as the flexible glass ribbon 46 passes through the cutting zone 140. In other embodiments, a bent target segment may not be employed and the flexible glass ribbon 46 may be maintained substantially flat in the cutting zone.

As set forth above, providing the bent target segment 144 in a bent orientation within the cutting zone 140 can help stabilize the flexible glass ribbon 46 during the cutting procedure. Such stabilization can help prevent buckling or disturbing the glass ribbon profile during the procedure of separating at least one of the first and second edges 102 and 104. Moreover, the bent orientation of the bent target segment 144 can increase the rigidity of the bent target segment 144 to allow optional fine tune adjustment of the lateral orientation of the bent target segment 144. As such, the flexible glass ribbon 46 can be effectively stabilized and properly laterally oriented without contacting the first and second broad surfaces of the central portion 106 during the procedure of separating at least one of the first and second edges 102 and 104.

Figure 4:
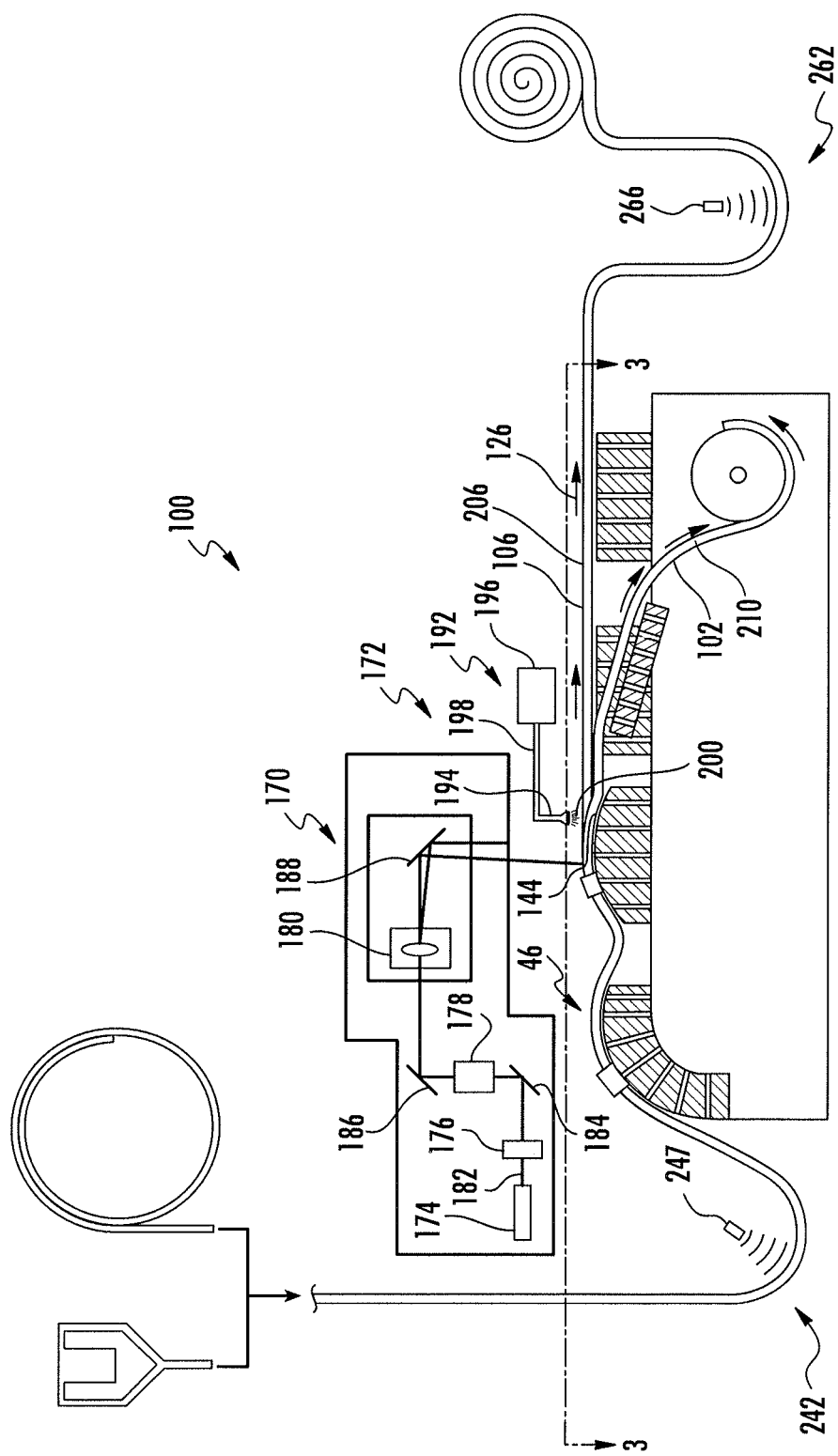
FIG. 4 is a schematic, side view of the edge trimming method and apparatus of FIG. 3.

The apparatus 100 can further include a wide range of edge trimming apparatus configured to separate the first and second edges 102 and 104 from the central portion 106 of the flexible glass ribbon 46 in a continuous fashion. In one example, as shown in FIG. 4, one example edge trimming apparatus 170 can include an optical delivery apparatus 172 for irradiating and therefore heating a portion of the upwardly facing surface of the bent target segment 144. In one example, optical delivery apparatus 172 can comprise a cutting device for example the illustrated laser 174 although other radiation sources may be provided in further examples. The optical delivery apparatus 172 can further include a circular polarizer 176, a beam expander 178, and a beam shaping apparatus 180.

The optical delivery apparatus 172 may further comprise optical elements for redirecting a beam of radiation (e.g., laser beam 182) from the radiation source (e.g., laser 174), for example mirrors 184, 186 and 188. The radiation source can comprise the illustrated laser 174 configured to emit a laser beam having a wavelength and a power suitable for heating the flexible glass ribbon 46 at a location where the beam is incident on the flexible glass ribbon 46. In one embodiment, laser 174 can comprise a $CO_2$ laser although other laser types may be used in further examples.

As further shown in FIG. 4, the example edge trimming apparatus 170 can also include a coolant fluid delivery apparatus 192 configured to cool the heated portion of the upwardly facing surface of the bent target segment 144. The coolant fluid delivery apparatus 192 can comprise a coolant nozzle 194, a coolant source 196 and an associated conduit 198 that may convey coolant to the coolant nozzle 194.

In one example, a coolant jet 200 comprises water, but may be any suitable cooling fluid (e.g., liquid jet, gas jet or a combination thereof) that does not stain or damage the upwardly facing surface of the bent target segment 144 of the flexible glass ribbon 46. The coolant jet 200 can be delivered to a surface of the flexible glass ribbon 46 to form a cooling zone 202. As shown, the cooling zone 202 can trail behind a radiation zone 204 to propagate an initial crack (FIG. 3).

The combination of heating and cooling with the optical delivery apparatus 172 and the coolant fluid delivery apparatus 192 can effectively separate the first and second edges 102 and 104 from the central portion 106 while minimizing or eliminating undesired residual stress, microcracks or other irregularities in the opposed edges 206, 208 of the central portion 106 that may be formed by other separating techniques. Moreover, due to the bent orientation of the bent target segment 144 within the cutting zone 140, the flexible glass ribbon 46 can be positioned and stabilized to facilitate precise separating of the first and second edges 102 and 104 during the separating process. Still further, due to the convex surface topography of the upwardly facing convex support surface, the continuous strips of edge trim 210 and 212 can immediately travel away from the central portion 106, thereby reducing the probability that the first and second edges 102 and 104 will subsequently engage (and therefore damage) the first and second broad surfaces and/or the high quality opposed edges 206, 208 of the central portion 106. The central portion 106 may then be wound into a roll using a winding apparatus 270.

Figure 5:
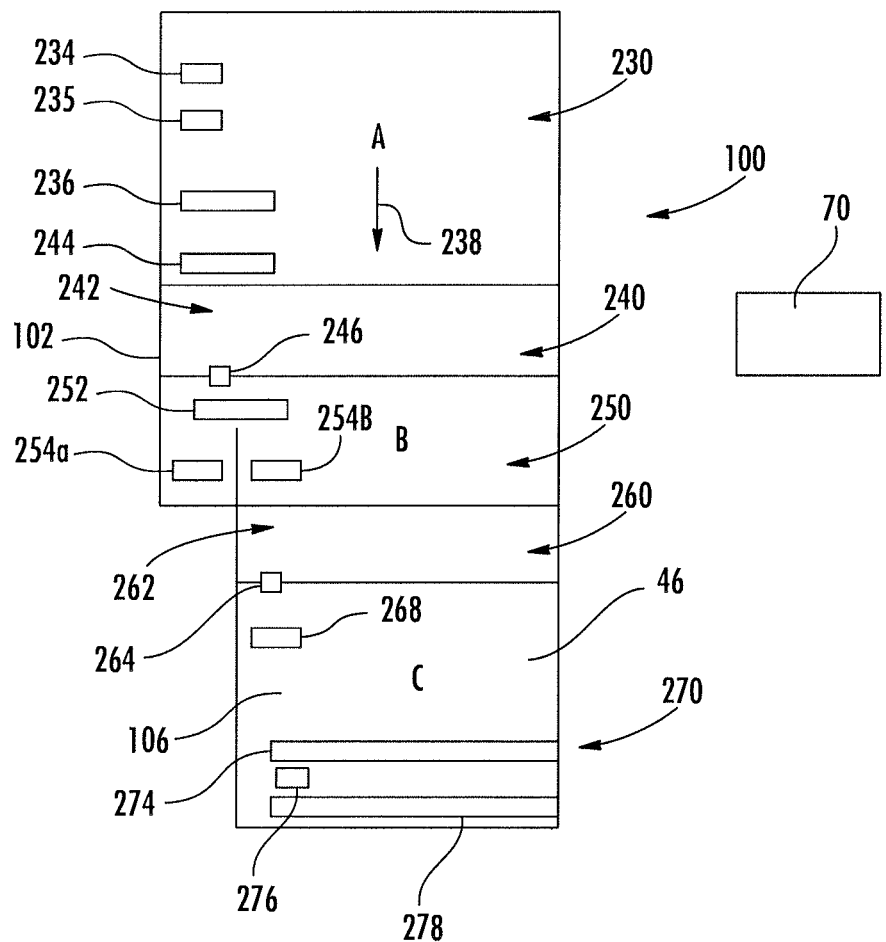
FIG. 5 is a schematic, plan view of an embodiment of a glass processing apparatus over one half of a width of the flexible glass ribbon that can include the flexible glass forming apparatus of FIG. 1, the edge trimming apparatus of FIG. 3 and a glass winding apparatus.

Referring to FIG. 5, as can be appreciated, the various processes (e.g., forming, edge separating and rolling) may introduce instabilities, perturbations, vibrations, and transient effects to the flexible glass ribbon 46 as the flexible glass ribbon 46 travels through the glass processing apparatus 100. As noted above, FIG. 5 is a schematic view of one half of a glass ribbon, whereupon it will be appreciated that a similar arrangement will exist on the right half of this figure but, in the interest of simplifying the discussion, is not shown. To reduce the upstream and/or downstream impact of any instabilities, perturbations, vibrations, and transient effects, the glass processing apparatus may be divided into a number of isolated processing zones, each zone corresponding to one or more different processes. In the illustrated example shown schematically, processing zone A includes a flexible glass ribbon forming process, processing zone B includes a flexible glass ribbon cutting process and processing zone C includes a flexible glass ribbon winding process, where the processes within the processing zones may be similar to any of the processes described above.

Processing zone A may include a forming apparatus 230, similar to or the same as the forming apparatus 22 described above with reference to FIG. 1, where a fusion draw process is used to produce the flexible glass ribbon 46. Stability of the flexible glass ribbon 46 within processing zone A may be achieved through use of driven rollers (e.g., multiple elevations of driven roller pairs) represented by elements 234, 235 and 236 applying adjustable mechanical tensions in the direction of travel shown by arrow 238 {for example, from about 0.36 kilograms per meter (kg/m) to about 8.9 kg/m (0.02 pounds per linear inch (pli) to about 0.5 pli), for example from about 0.9 kg/m to about 5.4 kg/m (from about 0.05 pli to about 0.3 pli), for example from about 1.4 kg/m to about 2.7 kg/m (from about 0.08 pli to about 0.15 pli)} as well as cross-direction tension, if needed. One or more of the driven rollers 234, 235 and 236 (e.g., driven roller 235) may also be used by the global control device 70 to set a global master speed, e.g., from about 84 millimeters per second (mm/s) to about 255 mm/s (e.g., from about 200 inches per minute (ipm) to about 600 ipm) of the flexible glass ribbon 46 within at least processing zone A.

A buffer zone 240 is provided between processing zone A and processing zone B for process isolation between the processing zones A and B. Within the buffer zone 240, the flexible glass ribbon 46 may be held in a free loop 242 (FIG. 4) and may hang in a catenary between two pay off positions defined by driven rollers 244 and 246 (more particularly, the location where the flexible glass ribbon 46 releases from the driven rollers 244 and 246). For example, rollers 244 and 246 may be from 4 meters to 12 meters apart, for example, from about 1.5 meters to about 7.5 meters apart, to allow use of a number of cullet chutes, loop out mitigation devices, etc. Between these two pay off positions the flexible glass ribbon 46 is not pulled tight and hangs under its own weight. For example, the tension in the flexible glass ribbon 46 can be no more than about 1.8 kg/m (about 0.1 pli), for example from about 0.18 kg/m to about 1.8 kg·m (from about 0.01 pli to about 0.1 pli) within the free loop 242.

The free loop 242 shape can self-adjust depending on the amount of pull force and gravitational force within the buffer zone 240. The free loop 242 can accommodate more or less flexible glass ribbon 46 by adjusting the free loop 242 shape, which is controlled by tension within the free loop 242. The buffer zone 240 can serve as an accumulator of error between processing zones A and B. The buffer zone 240 can accommodate errors for example path length differences due to velocity, twist or shape variance due to strain mismatch and machine misalignment errors. In some embodiments, a loop sensor 247, for example an ultrasonic or optical sensor, may be provided to maintain a preselected loop height. In some embodiments, a tension sensor (e.g., a strain gauge) may be provided to measure tension within the flexible glass ribbon 46. In some embodiments, the drives driving the rollers may have an in-line torque transducer used to measure tension within the flexible glass ribbon 46. The sensors may provide real-time information to the global control device 70, which can adjust the speed and/or tension of the driven rollers 244 and 246 based on the information.

Processing zone B may include an edge trimming apparatus 250, similar to or the same as the edge trimming apparatus 170 described above with reference to FIGS. 3 and 4, where first and second edges (only edge 102 is shown in FIG. 5) are separated from central portion 106 of the flexible glass ribbon 46. Stability of the flexible glass ribbon 46 within the processing zone B may be achieved through use of driven rollers represented by elements 252 and 254a and 254b. Roller 246 may be driven during initial threading of the flexible glass ribbon 46, but may thereafter be idle for cross-direction steering or guiding of the flexible glass ribbon 46 within the processing zone B. The driven rollers 252, 254a and 254b may be used to provide tension {for example, from about 0.36 kilograms per meter to about 8.9 kg/m (0.02 pounds per linear inch to about 0.5 pli), for example from about 0.9 kg/m to about 5.4 kg/m (from about 0.05 pli to about 0.3 pli), for example from about 1.4 kg/m to about 2.7 kg/m (from about 0.08 pli to about 0.15 pli)} within the cutting zone 140 (FIG. 3) and to control steering of the flexible glass ribbon 46 and first and second edges (only edge 102 is shown) as they are separated from the central portion 106. One or more of the driven rollers 252 and 245b (e.g., driven roller 254b) may be used by the global control device 70 to set a local master speed {e.g., from about 84 mm/s to about 255 mm/s (e.g., from about 200 ipm to about 600 ipm)} within the processing zone B. It should be noted that speed variance between the global and local master speeds within the zones A, B and C, if any, is to allow for tension management within the flexible glass ribbon 46, as well as absolute error management.

Another buffer zone 260 is provided between processing zone B and processing zone C for process isolation between the processing zones B and C. Within the buffer zone 260, the flexible glass ribbon 46 may be held in a free loop 262 (FIG. 4) and may hang in a catenary between two pay off positions defined by driven rollers 254b and 264). For example, rollers 254b and 264 may be from about 4 meters to about 12 meters apart, for example, from about 1.5 meters to about 7.5 meters apart, to allow use of a number of cullet chutes, loop out mitigation devices, etc. Between these two pay off positions the flexible glass ribbon 46 is not pulled tight and hangs under its own weight. For example, the tension in the flexible glass ribbon 46 can be no more than about 1.8 kg/m (about 0.1 pli), for example from about 0.18 kg/m to about 1.8 kg/m (from about 0.01 pli to about 0.1 pli) within the free loop 262.

The free loop 262 shape can self-adjust depending on the amount of pull force and gravitational force within the buffer zone 260. The free loop 262 can accommodate more or less flexible glass ribbon 46 by adjusting the free loop 262 shape, which is controlled by tension within the free loop 262. The buffer zone 260 can serve as an accumulator of error between processing zones B and C. The buffer zone 260 can accommodate errors for example path length differences due to velocity, twist or shape variance due to strain mismatch and machine misalignment errors. In some embodiments, a loop sensor 266, for example an ultrasonic or optical sensor, may be provided to maintain a preselected loop height. In some embodiments, a tension sensor (e.g., a strain gauge) may be provided to measure tension within the flexible glass ribbon 46. The sensors may provide real-time information to the global control device 70, which can adjust the speed and/or tension of the driven rollers 254b and 264 based on the information.

Processing zone C may include a winding apparatus 270, where the central portion 106 of the flexible glass ribbon 46 is wound into a roll. Stability of the flexible glass ribbon 46 within the processing zone C may be achieved through use of driven rollers represented by elements 268, 274, 276 and 278. Roller 264 may be driven during initial threading of the flexible glass ribbon 46, but may thereafter be idle for cross-direction steering or guiding of the flexible glass ribbon 46 within the processing zone C. The driven rollers 268, 274, 276 and 278 may be used to provide tension (e.g., from about 2.7 kg/m to about 6.3 kg/m (from about 0.15 pli to about 0.35 pli)) within processing zone C and to control steering of the flexible glass ribbon 46. In some embodiments, for example, when a driven roller is used to apply tension to the glass as it is being rolled, due to increasing diameter of the glass roll, torque from that driven roller may be adjusted to result in tension (in the flexible glass ribbon being rolled) decreasing from about 6.3 kg/m to about 2.7 kg/m (from about 0.35 pli to about 0.15 pli) as a linear ramp. One or more of the driven rollers 268, 274, 276 and 278 (e.g., driven rollers 274 and 278) may be used to by the global control device 70 to set a local master speed {e.g., from about 84 mm/s to about 255 mm/s (e.g., from about 200 ipm to about 600 ipm)} within the processing zone C.

Figure 6:
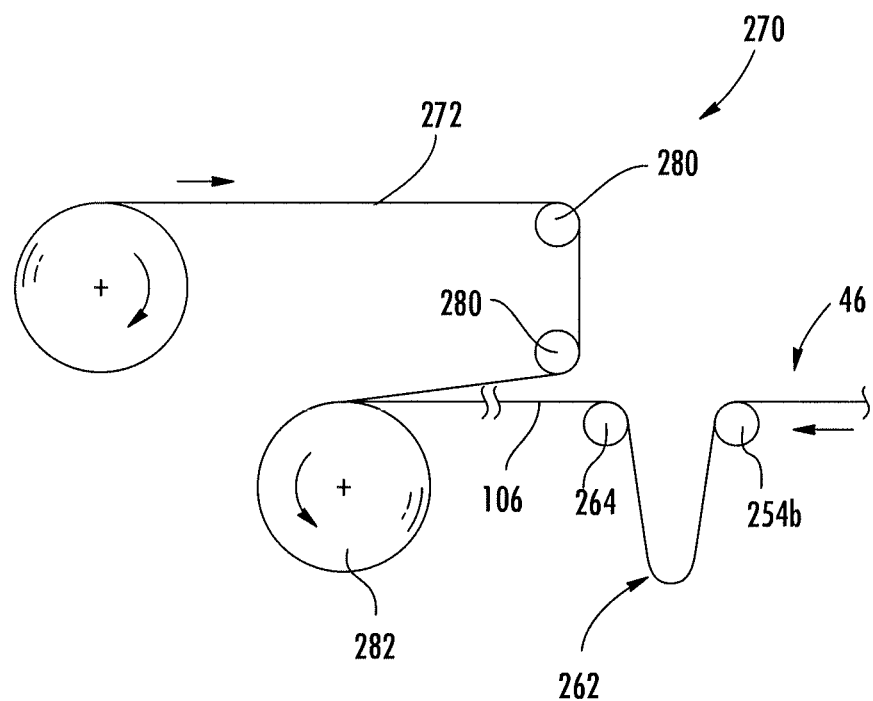
FIG. 6 illustrates an embodiment of a glass winding apparatus for use in the glass processing apparatus of FIG. 5.

As one example, FIG. 6 illustrates schematically a winding apparatus 270 for rolling the central portion 106 of the flexible glass ribbon 46 together with an interleaving material 272. The driven rollers 254b and 264 may be used for guiding the central portion 106 of the flexible glass ribbon 46 and driven rollers 280 may be used for guiding the interleaving material 272. The driven rollers 254b, 264 and 280 guide the flexible glass ribbon 46 and the interleaving material 272 to a roll 282, where they may be wound together. The free loop 262 isolates processing zone C from processing zone B and compensates for differences (for example, as when rolling speed is varied at roll change over) in the flexible glass ribbon speeds between the upstream and rolling processes. In some embodiments, a surface protective film may be applied to one or both broad surfaces of the central portion 106 of the flexible glass ribbon 46.

The above-described methods and apparatus for continuous manufacturing of flexible glass ribbon can provide ultra-thin flexible glass ribbon while maintaining precise flexible glass ribbon position management in each of the processing zones A-C (e.g., forming, cutting, spooling, etc.). As a moving body, the flexible glass ribbon can travel along a pre-defined direction, aligned with the various processing apparatus. Tension within the flexible glass ribbon can be adequate and conform to the needs of each of the processing steps within each of the processing zones. The processing zones A-C and their respective process steps can be isolated from process steps of the other processing zones using the buffer zones and free loops. The global control device can control tension and velocity locally within each of the processing zones and globally using real-time feedback from the various tension, speed and position sensors located within the processing zones.

The above-described methods and apparatus for continuous manufacturing of flexible glass ribbon can provide a robust management system with active steering, tension control and disturbance isolation to produce ultra-thin flexible glass spools. For example, the spools may include a ribbon having thicknesses ranging from about 200 microns to about 50 microns and ribbon widths ranging from about 1000 mm to about 3000 mm. A global architecture can be provided to stabilize the flexible glass ribbon via creation of three local zones and two isolation or buffer zones there between. In some embodiments, there may be one buffer zone between each adjacent local zone, each local zone corresponding to a different process. In the above-described example, a buffer zone is provided between flexible glass forming and edge or bead separation, and another buffer zone is provided between edge or bead separation and spooling. Within each of the processing zones, the flexible glass ribbon forces can be independently controlled by the global control device by balancing the pull force from the drive system within that zone and the internal force on the flexible glass ribbon from upstream and downstream processes. Within each of the processing zones, tension within the flexible glass ribbon can be maintained at a constant or nearly constant level, which can deliver consistent product attributes for example glass thickness, edge strength and spool quality.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the following claims.

What is claimed is:

1. A method of continuous processing of a flexible glass ribbon having a central portion and an edge portion, and having a thickness of no more than 0.3 mm, the method comprising:
   providing a glass processing apparatus having at least three processing zones including a first processing zone, a second processing zone and a third processing zone;
   continuously feeding at least the central portion of the flexible glass ribbon from the first processing zone having a first feed rate, through the second processing zone having a second feed rate to the third processing zone having a third feed rate;
   independently controlling the first, the second, and the third feed rates using a global control device;
   providing a first buffer zone between the first processing zone and the second processing zone in which the flexible glass ribbon is supported in a first catenary between a first set of two, spaced-apart payoff positions;
   providing a second buffer zone between the second processing zone and the third processing zone in which the central portion of the flexible glass ribbon is supported in a second catenary between a second set of two, spaced-apart payoff positions;
   wherein the third feed rate is adjusted by the global control device based on an input signal from a tension sensor located so as to measure tension in the central portion of the flexible glass ribbon in the second catenary; and
   wherein the global control device drives a roller in the third processing zone such that the measured tension in the central portion of the flexible glass ribbon is decreased linearly from a first value to a second value.

2. The method of claim 1, wherein tension within the central portion of the flexible glass ribbon in a travel direction is no more than about 1.8 kg/m in at least one of the first buffer zone and the second buffer zone.

3. The method of claim 1, wherein tension within the central portion of the flexible glass ribbon in a travel direction is from about 0.9 kg/m to about 5.4 kg/m in at least one of the first, second and third processing zones.

4. The method of claim 1, wherein tension within the central portion of the flexible glass ribbon in a travel direction is from about 1.4 kg/m to about 2.7 kg/m in at least one of the first, second and third processing zones.

5. The method of claim 1 comprising producing the flexible glass ribbon in the first processing zone using a forming apparatus.

6. The method of claim 5, wherein the step of producing the flexible glass ribbon includes using a fusion draw process.

7. The method of claim 1 comprising separating the edge portion from the central portion of the flexible glass ribbon as the flexible glass ribbon moves by a cutting device within the second processing zone thereby forming a continuous strip of edge trim.

8. The method of claim 1 comprising winding the central portion of the flexible glass ribbon into a roll at the third processing zone using a winding apparatus.

9. The method of claim 1, wherein at least one of the first or the second set of two, spaced-apart payoff positions are formed using a set of rollers.

10. The method of claim 9, wherein a rotation of at least one roller of the set of rollers of the at least one of the first or the second set of two, spaced-apart payoff positions is controlled by the global control device.

11. The method of claim 1 wherein at least one of the first or the second feed rates is adjusted by the global control device based on an input signal from an input sensor.

12. The method of claim 11 wherein the input sensor is a first tension sensor and is located so as to measure tension in the central portion of the flexible glass ribbon in the first catenary.

13. The method of claim 11 wherein the input sensor comprises a first sensor and a second sensor, wherein the first and second sensors are unalike, and wherein each of the first and second sensor is selected from the group consisting of a tension sensor, a speed sensor, and a position sensor.

14. The method of claim 1 wherein the tension sensor is selected from the group consisting of a strain gauge, a torque transducer, and combinations thereof.

15. A method of continuous processing of flexible glass ribbon having a central portion and an edge portion, and having a thickness of no more than 0.3 mm, the continuous processing using a glass processing apparatus including a forming apparatus in a first processing zone, an edge trimming apparatus in a second processing zone and a winding apparatus in a third processing zone, the method comprising:
   forming the flexible glass ribbon in the first processing zone and feeding the flexible glass ribbon though the first processing zone at a first feed rate;
   feeding at least the central portion of the flexible glass ribbon through the second processing zone at a second feed rate while separating the edge portion from the central portion of the flexible glass ribbon as the flexible glass ribbon moves by a cutting device within the second processing zone thereby forming a continuous strip of edge trim;
   feeding the central portion of the flexible glass ribbon through the third processing zone at a third feed rate while winding the central portion of the flexible glass ribbon into a roll;
   wherein the first, the second, and the third feed rates are controlled independently by a global control device;
   wherein the third feed rate is adjusted by the global control device based on an input signal from a tension sensor located so as to measure tension in the central portion of the flexible glass ribbon in the second catenary; and
   wherein the global control device drives a roller in the third processing zone such that the measured tension in the central portion of the flexible glass ribbon is decreased linearly from a first value to a second value.

16. The method of claim 15 further comprising providing a first buffer zone between the first processing zone and the second processing zone in which the flexible glass ribbon is supported in a first catenary between a first set of two, spaced-apart payoff positions.

17. The method of claim 16 further comprising providing a second buffer zone between the second processing zone and the third processing zone in which the central portion of the flexible glass ribbon is supported in a second catenary between a second set of two, spaced-apart payoff positions.

18. The method of claim 17, wherein tension within the central portion of the flexible glass ribbon in a travel direction is no more than about 1.8 kg/m in at least one of the first buffer zone and the second buffer zone.

19. The method of claim 17, wherein at least one of the first or the second set of two, spaced-apart payoff positions are formed using a set of rollers.

20. The method of claim 19, wherein a rotation of at least one roller of the set of rollers of the at least one of the first or the second set of two, spaced-apart payoff positions is controlled by the global control device.

21. The method of claim 15 wherein at least one of the first or the second feed rates is adjusted by the global control device based on an input signal from an input sensor.

22. The method of claim 21 wherein the input sensor is a first tension sensor and is located so as to measure tension in the central portion of the flexible glass ribbon in the first catenary.

23. The method of claim 21 wherein the input sensor comprises a first sensor and a second sensor, wherein the first and second sensors are unalike, and wherein each of the first and second sensor is selected from the group consisting of a tension sensor, a speed sensor, and a position sensor.

24. The method of claim 15 wherein the tension sensor is selected from the group consisting of a strain gauge, a torque transducer, and combinations thereof.

25. A glass processing apparatus that processes a flexible glass ribbon having a central portion and an edge portion, and having a thickness of no more than 0.3 mm comprising:
   a forming apparatus in a first processing zone, the forming apparatus configured to form the flexible glass ribbon in the first processing zone;
   an edge trimming apparatus in a second processing zone, the edge trimming apparatus configured to separate the edge portion from the central portion of the flexible glass ribbon as the flexible glass ribbon moves by a cutting device within the second processing zone thereby forming a continuous strip of edge trim;
   a winding apparatus in a third processing zone, the winding apparatus configured to wind the central portion of the flexible glass ribbon into a roll;
   a first buffer zone between the first processing zone and the second processing zone in which the flexible glass ribbon is supported in a first catenary between a first set of two, spaced-apart payoff positions;
   a second buffer zone between the second processing zone and the third processing zone in which the central portion of the flexible glass ribbon is supported in a second catenary between a second set of two, spaced-apart payoff positions;
   a global control device that independently controls, for at least the central portion of the flexible glass substrate, a first feed rate through the first processing zone, a second feed rate through the second processing zone, and a third feed rate through the third processing zone;
   wherein the third feed rate is adjusted by the global control device based on an input signal from a tension sensor located so as to measure tension in the central portion of the flexible glass ribbon in the second catenary; and
   wherein the global control device drives a roller in the third processing zone such that the measured tension in the central portion of the flexible glass ribbon is decreased linearly from a first value to a second value.

26. The glass processing apparatus of claim 25, wherein at least one of the first or the second set of two, spaced-apart payoff positions are formed using a set of rollers.

27. The glass processing apparatus of claim 26, wherein a rotation of at least one roller of the set of rollers of the at least one of the first or the second set of two, spaced-apart payoff positions is controlled by the global control device.

28. The glass processing apparatus of claim 25, wherein the forming apparatus is configured to form the flexible glass ribbon using a fusion draw process.

29. The glass processing apparatus of claim 25 wherein at least one of the first or the second feed rates is adjusted by the global control device based on an input signal from an input sensor.

30. The glass processing apparatus of claim 29 wherein the input sensor is a first tension sensor and is located so as to measure tension in the central portion of the flexible glass ribbon in the first catenary.

31. The glass processing apparatus of claim 29 wherein the input sensor comprises a first sensor and a second sensor, wherein the first and second sensors are unalike, and wherein each of the first and second sensor is selected from the group consisting of a tension sensor, a speed sensor, and a position sensor.

32. The glass processing apparatus of claim 25 wherein the tension sensor is selected from the group consisting of a strain gauge, a torque transducer, and combinations thereof.

* * * * *